Jan. 19, 1943.  J. W. HATCH  2,308,954
BRAKING MECHANISM
Filed March 20, 1940

INVENTOR
James W. Hatch

BY

ATTORNEYS

Patented Jan. 19, 1943

2,308,954

UNITED STATES PATENT OFFICE 2,308,954

BRAKING MECHANISM

James W. Hatch, Akron, Ohio, assignor to The Firestone Tire & Rubber Company, Akron, Ohio, a corporation of Ohio Application March 20, 1940, Serial No. 324,983

2 Claims. (Cl. 188—152)

This invention relates to braking mechanisms generally, more especially to braking mechanism for vehicle wheels, particularly wheels used on airplanes.

The present invention comprises an improvement upon the braking mechanism shown in my copending application, Serial No. 256,118, filed February 13, 1939, now Patent 2,248,171, July 8, 1941, and my copending joint patent application with Mr. William J. Burman, Serial No. 198,356, filed March 28, 1938, now Patent 2,194,853, March 26, 1940.

The general object of this invention is to provide an improved multiple block braking construction which is particularly adapted to have the individual blocks thereof separately removed and replaced, when desired.

Another object of the invention is to provide a multiple block brake wherein the individual blocks are positively positioned against circumferential movement, but which are adapted to have limited radial movement to aid in effecting braking action.

A further object of the invention is to provide readily positionable, easily accessible means for retaining the individual brake blocks in a multiple block brake out of braking relation with the means associated therewith.

The above and further objects will be manifest from the following specification.

Figure 1:
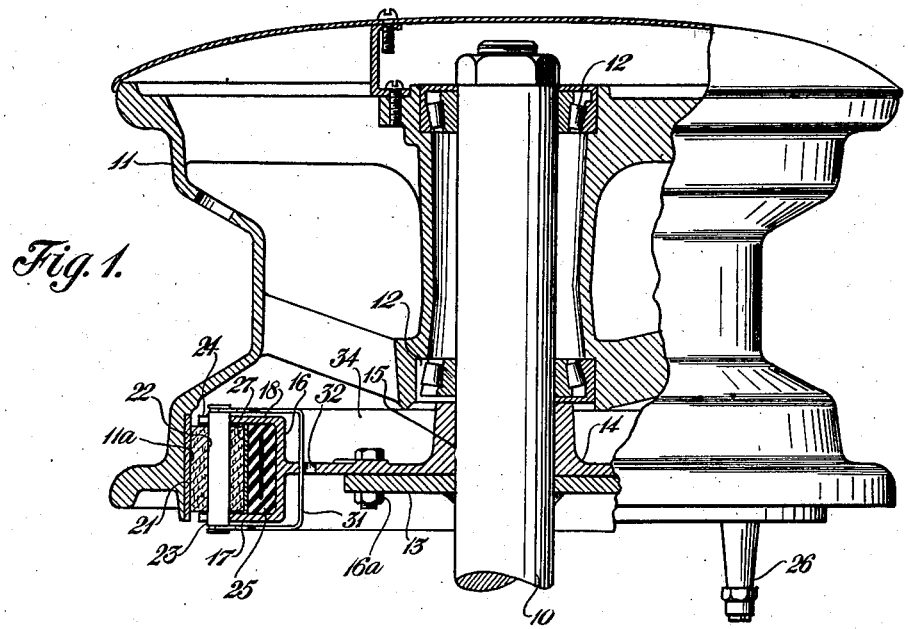
Figure 1 is a sectional elevation on line 1—1 of the embodiment of the invention shown in Figure 2.

Referring specifically to the apparatus shown in Figure 1, an axle 10 is shown on which an annular wheel 11, having an annular cylindrical braking drum 11ᵃ secured to its inner surface, is rotatably carried through suitable bearing means 12. A disk 13 is welded to the axle 10 and a brake torque plate 14 having a hub 15 at its center and an integral, outwardly open, annular, substantially U-shaped (in section) flange or channel 16 at its outer periphery is secured to the disk 13 by bolts 16ᵃ. As explained in detail in my copending joint application, the hub 15 may aid in retaining the bearing means 12 in position.

The braking means for the wheel construction of the invention are mounted in the channel 16, which has side walls 17 and 18. These means comprise individual brake blocks 21, slightly arcuate in section, which have holes 22 extending through the center portion thereof in an axial direction relative to the axle 10. Metal pins 23 extend through these holes 22 and are received in pairs of circumferentially spaced, radially directed slots 24 formed in the side walls 17 and 18 of the channel 16. These slots 24 are axially opposed and are of such size as to receive the pins 23 snugly and prevent any circumferential movement thereof. Note that the slots 24 are open at the periphery of the channel 16 whereby the pins 23 mounting the brake blocks 21 are readily positioned in the slots and are thereby mounted for limited radial movement. In this embodiment of my invention an annular rubber tube 25 is provided in the base of the channel 16, which tube is connected to a suitable source (not shown) of air or liquid, under pressure, by a valve 26 whereby the tube 25 can be expanded radially outwardly from the base of the channel 16, which in turn moves the brake blocks 21 radially outwardly. To form an expandable surface for the tube 25 to bear upon, a plurality of tube protecting strips 27 are positioned between the bases of the brake blocks 21 and the outer surface of the tube 25. These tube protector strips 27 are slightly arcuate in section and have the ends 27ᵃ thereof bent outwardly at an angle of about 90° relative to the remainder thereof which adapts the tube protector strips to engage with one end of the brake blocks 21. The remaining ends of the tube protector strips are depressed slightly in a radial direction and are made long enough to overlap the adjacent brake block an appreciable distance. Hence, the tube protector strips all overlap and form an outer confining ring for the rubber tube 25 to bear upon in transmitting pressure to the brake blocks.

A feature of the present invention is the provision of substantially U-shaped return springs 31 that engage with the ends of the pins 23 and normally urge the individual brake blocks radially inwardly relative to the brake torque plate 14 so as to retain them out of contact with the inner braking surface 11ᵃ of the wheel 11. These U-shaped springs 31 extend through slots 32 formed in the brake torque plate 14 and the apparatus is constructed and arranged so that the springs 31 normally are under slight tension whereby the individual brake blocks are constantly urged radially inwardly of the wheel 11. Normally this force retains the brake blocks out of contact with the surface 11ᵃ of the wheel but immediately adjacent same.

The rubber tube 25 may have an initial pressure set up therein and, in all events, should be arranged so that a slight additional force exerted thereon, through the valve 26, will force the tube outwardly and effect the desired braking action, since the rubber tube is confined against all but radially outward movement and it initially bears upon the brake blocks 21.

From the foregoing, it is seen that a sturdy braking mechanism, the individual braking blocks of which are readily removable, is provided by the present invention. Specifically the springs 30 are outside of the brake mechanism proper whereby they are readily accessible and are not affected by the heat produced in action of the braking mechanism, nor are they subject to the dirt accumulation occurring in the brake. Also, the pins 23 mounting the brake blocks are easily accessible to aid in changing brake blocks. The present construction simplifies positioning the brake blocks against circumferential movement during braking action or at any other time. It will be observed that the brake parts are interchangeable and are easily made, whereas, of course, one brake block may be removed individually from the brake without changing the position of any second brake block.

Figure 2:
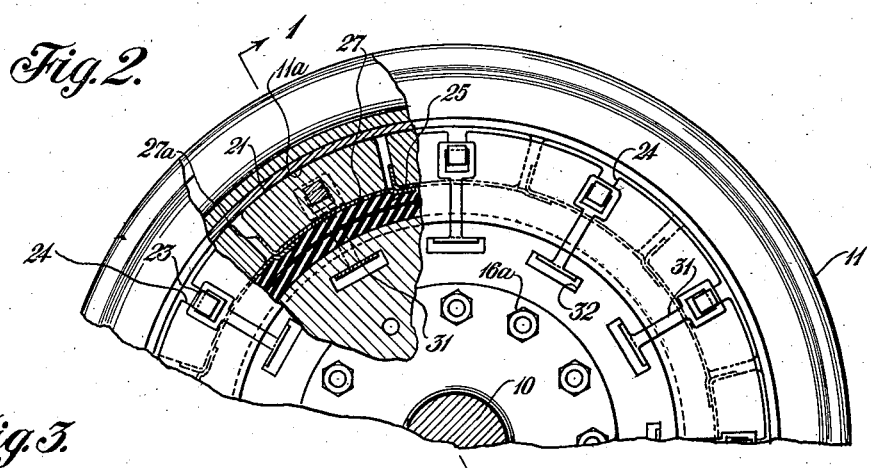
Figure 2 is an elevation, partly in section, of one embodiment of the invention.
Figure 3:
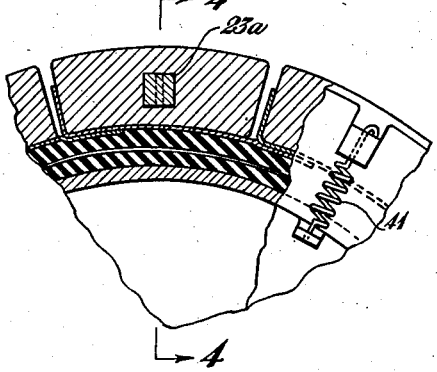
Figure 3 is an elevation, partly in section, of a fragment of a brake mechanism comprising a modification of the invention.
Figure 4:
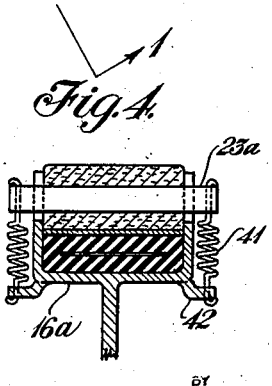
Figure 4 is a vertical sectional elevation on line 4—4 of Figure 3.

In the modified form of the invention shown in Figures 3 and 4, the general construction of the brake and wheel are similar to that shown in Figures 1 and 2. A feature of the present brake construction includes the use of short springs 41 which engage with the ends of the pins 23ᵃ extending beyond the side walls of the channel 16ᵃ. The other ends of the springs 41 engage with outwardly struck lugs 42 associated with the base of the channel 16ᵃ. These springs are easily positioned and of simple construction, but they very effectively serve to retain the brake blocks normally in their radial inward positions relative to the confining wheel or brake drum associated therewith.

While a written description and illustration of two embodiments of the invention are disclosed herein, it will be understood that further modifications can be made without departing from the scope of the invention as defined in the appended claims.

What is claimed is:

1. In a wheel and brake assembly, the combination with an axle and a chambered wheel hub rotatable thereon, said hub having an annular brake drum within the chamber thereof, of a radially extending member fixed to the axle and disposed within the hub chamber, said member having an annular margin provided with an outwardly open chamber, a plurality of brake shoes disposed in circumferential series within the chamber, a pneumatically inflatable element disposed within the chamber between the brake shoes and the inner chamber wall, and a tube protector strip disposed between each shoe and said element, said strips having one end outwardly flanged to engage a shoe end and an opposite end extending circumferentially beyond the flanged end of the next adjacent strip in overlapping relation thereto, whereby upon inflation of said element, pressure is transmitted evenly from the inflatable element through the protector strips to the brake shoes to urge them into engagement with the drum, and means inwardly biasing the blocks against the expansion of said inflatable element and for disengaging each brake shoe from the drum upon deflation of said element.

2. The device of claim 1 wherein said biasing and disengaging means comprises a bar extending through each shoe at a point substantially mid-way between the ends thereof and spaced from the drum contacting surface, the walls of said member being slotted to permit radial movement of the bar, each end of each bar being engaged by a spring having its opposite end anchored to said member, whereby each shoe is normally urged radially inwardly.

JAMES W. HATCH.